નgbg# 3,814,637
LOW SMOKE CRYSTAL FLUX
Peter H. Scott, Sudbury, Mass., assignor to W. R. Grace & Co., Cambridge, Mass.
No Drawing. Filed Jan. 22, 1973, Ser. No. 325,533
Int. Cl. B23k 35/34
U.S. Cl. 148—23                                    4 Claims

ABSTRACT OF THE DISCLOSURE

Zinc chloride-ammonium chloride type fluxes containing finely divided magnesium silicate and having a long pot life and low smoke emission characteristics have been devised for use on the surface of soldering baths from which molten solder is flowed into the side seam of metal container bodies.

THE PRIOR ART

In the manufacture of sanitary can bodies, suitably notched sheet metal blanks are fed to a farming station where they are shaped and where the opposed marginal edges which ultimately form the side seam of the can are reversely bent into oppositely directed body hooks. The body hooks are then interengaged and flattened by bumping to form an interlocked seam. After this forming operation, the can bodies are conveyed in longitudinal spaced relationship over a rotating solder roll which engages against the seam of the bodies as they are moved edgewise therealong. The solder roll, partially submerged in a bath of molten solder, raises the solder in a film and wipes it into the side seam. Ordinarily, the molten solder is maintined at a temperature considerably in excess of its melting point so that it will remain fluid until capillarity has drawn enough liquid into the seam to flood it.

In order to keep the surface of the solder roll clean and "tinned," it is customary to use a flux on the side of the bath where the roll enters the solder. For this purpose, the flux employed must be capable of efficiently removing oxide coatings and other interfering films from the roll so as to create surface conditions which will permit the molten solder to flow freely and spread completely over the working surface of the roll. Also, the flux must have a reasonably long pot life, i.e. the wetting properties and cleaning efficiency of the flux should extend over a period of several hours under the operating conditions employed.

Because of the low tin-content solders used in the can making industry today, solder baths must be maintained at comparatively high temperatures. For example, the tin-lead solders currently employed contain about 5 percent or less tin and have a melting point in excess of 600° F. Therefore, the soldering baths must be maintained at a temperature in the range from about 670° to over 800° F., and usually between about 725° and 760° F., so that the molten solder will have the flow characteristics necessary to allow a sufficient amount of material to enter the body seams to provide the necessary hermetic seal.

While various fluxes have been employed with tin-lead solders, zinc-ammonium chloride fluxes are most widely used. One of the most satisfactory fluxes of this type contains a body of low density, inert, granular siliceous particles capable of absorbing the fused zinc-ammonium salts. This flux, compared to an identical composition without a siliceous granular absorber, is active over longer periods of time under similar operating conditions. Presumably, the granular mass serves as a heat insulator which lowers the temperature of the crystal surface over the solder surface temperature. Also, the individual siliceous particles appear to serve as nuclei for the condensation of ammonium chloride. The volatilization of the latter substance is thereby reduced, thus extending its availability for regeneration of fluxing power of the zinc chloride by reaction with the zinc oxychloride yielded by the reaction of zinc chloride and metal oxide on the solder roll surface. Due to its increased active life under various operating conditions, this flux has been widely used in can making and other applications where the articles to be soldered are passed over the solder roll at a comparatively rapid rate. However, in order to achieve and maintain top production speeds, the can making industry today prefers a flux having an even longer pot life especially at temperatures of 800° F. and higher so that there will be fewer delays for replenishing the spent flux. Also, ecological and health considerations indicate the need for sensible reduction in the production of the corrosive smoke which normally attends can tinning operations.

SUMMARY OF THE INVENTION

Fluxes having an extended life with significantly reduced smoke production can be prepared for use on high temperature solder bath by substituting finely divided magnesium silicate for the lightweight particulate siliceous material that is conventionally incorporated in zinc ammonium chloride compositions. It has been found that the silicate containing fluxes of the invention have a materially increased life at all usable temperatures and especially at temperatures of 750° to 825° F., as compared to conventional fluxes. It has also been discovered that the emission of corrosive smoke is substantially diminished when the substitution is effected.

The fluxes of the invention comprise essentially at least 60% by weight of a mixture of zinc chloride and ammonium chloride to which the ammonium salt contributes between about 44 and 54% of the weight, and about 1.5 to 10% of a finely divided silicate. Other ingredients such as zinc oxide, zinc carbonate, alkali metal salts, lightweight particulate siliceous materials, finely divided carbon and certain organic resins are advantageously incorporated in conventional proportions.

DETAILED DESCRIPTION

In preparing the flux of the present invention, zinc chloride and ammonium chloride may be combined in the various proportions known to the art. However, because of its regenerative function, the ammonium chloride preferably constitutes at least about 44% by weight of the total quantity of these two salts, with the best results obtained within the range of 44 to 54% by weight since quantities greater than 54% tend to increase the fusion temperature to the point that the flux does not melt easily below soldering temperatures. The desired proportions may be achieved by adding the single salt ($ZnCl_2.NH_4Cl$), the double salt ($ZnCl_2.2NH_4Cl$), the triple salt $$(ZnCl_2.3NH_4Cl)$$

or mixtures of these salts.

The total amount of zinc chloride-ammonium chloride mixture used in the flux may vary over a wide range depending upon the other ingredients employed. However, the composition should contain at least about 60% by weight of this chloride mixture in order that rapid and effective removal of metal oxide film from the solder roll surface be insured.

In addition to the zinc ammonium chloride component just described, the flux of the invention must contain, on a weight basis, from about 1.5 to 10% of finely divided silicate, with a preferred range of about 3 to 5.5%. This material preferably has a particle size such that only about 1% of it is retained on a 325 mesh sieve, although powders not retained by sieves up to about 100 mesh can be employed with some advantage.

The flux of the invention may also contain the lightweight particulate siliceous material conventionally used in this type of composition. Such material can constitute up to about 12% of the composition's weight. Perlite is preferred, although other inert low density materials can be employed, including exfoliated vermiculite, pumice, diatomaceous earth and the like.

Alkali metal chlorides, including for example sodium chloride, potassium chloride and mixtures thereof, can be incorporated for melt temperature adjustment and maximization of flux life, as taught in U.S. Pat. 3,380,862, in quantities of up to about 20% of the total flux weight. Zinc oxide or zinc carbonate may also be added to prevent caking on storage and minimize the release of ammonium chloride fumes during soldering. The quantity of zinc compounds needed to achieve the desired result is usually about 5% of the composition's weight and may range from about 5 to 25%.

It is advantageous to include as well a minor quantity of resin in the composition to increase the flux life. The resin employed must have the essential property of melting before it begins to decompose upon being heated to fluxing temperatures. At soldering temperatures, the resin forms a scum on the surface of the flux which renders the flux mass less permeable to air and exerts some restraint on the escape of ammonium chloride vapor. The resins employed for this purpose generally have a melting point in the range of about 250° to 360° F. and are used in an amount of between about 0.1 and 1.0 weight percent of the flux composition. Among the resins which may be used is the gasoline-insoluble resin obtained from the extraction of pine wood in aromatic solvents; the hard, dark-colored, partially gasoline-soluble fraction obtained as a by-product in the manufacture of grade FF wood rosin; and the so-called "modified" resoles of the phenol-formaldehyde condensation type. Particularly useful phenol-formaldehyde resins are the resoles modified with rosin esters. Specific rosin ester-modified resoles include the "Beckacite" resins, such as "Beckacite No. 1100," a resole modified with glycerine ester of rosin and the "Pentacite" resins, such as "Pentacite No. 1405," a resole modified with the pentaerythritol ester of rosin.

The following examples will serve to illustrate typical embodiments of the invention, as well as some of their advantages over the prior art.

EXAMPLE 1

Several flux formulations were prepared with the double salt of zinc ammonium chloride, zinc oxide, resin and one or more ingredients selected from magnesium silicate, aluminum silicate, perlite and silica. The ingredients are mixed between 2 hours and 24 hours in a suitable ball mill or other appropriate mixing equipment to give a uniform blend. The actual nature and proportions of ingredients mixed are tabulated in the table below along with the pot life observed for each formulation when used at 750° F. on a conventional solder bath.

The specific material employed, apart from the zinc ammonium chloride and the zinc oxide, can be described as follows:

The magnesium silicate used in runs A to D is a water floated hydrated talc with a particle size such that 97.5% of the material passes through a 325 mesh sieve. The material has a weight loss of 7.5% on ignition.

The aluminum silicate (run E) is a water washed hydrous pigment leaving a maximum residue of 1% by weight on a 325 mesh screen. It contains more than 80% by weight of silica and alumina and has an ignition weight loss of about 14%.

The silica is prepared with commercial activated silica gel 6 to 16 mesh U.S. granules, 3:1 crystals ($ZnCl_2 \cdot 3NH_4Cl$), ammonium chloride and water in the manner of Example 2 of U.S. Pat. 3,350,244. It is then mixed with the other ingredients shown in the table (run F).

The expanded perlite used in runs D, G and H was a rather fine material with a particle size distribution such that the bulk of them is retained on screens Nos. 16, 30 and 50.

The resin employed was a phenolic material modified with glycerine ester of rosin. As a last minor ingredient, there was incorporated in each composition 0.1% by weight of white mineral oil.

| | Runs | | | | | | | |
|---|---|---|---|---|---|---|---|---|
| | A | B | C | D | E | F | G | H |
| Ingredients (weight percentages): | | | | | | | | |
| Zinc ammonium chloride | 89.5 | 87.7 | 88.6 | 88.5 | 89.5 | 73.0 | 86.1 | 89.4 |
| Zinc oxide | 7.2 | 7.2 | 7.2 | 7.2 | 7.2 | 3.9 | 11.0 | 7.2 |
| Resin | 0.1 | 0.2 | 0.15 | 0.1 | 0.1 | | 0.1 | 0.1 |
| Magnesium silicate | 3.1 | 4.8 | 3.95 | 3.1 | | | | |
| Perlite | | | | 1.0 | | | 2.8 | 3.2 |
| Aluminum silicate | | | | | 3.1 | | | |
| Silica | | | | | | 23.1 | | |
| Pot life at 750° F. (min.) | 255 | 270 | 240 | 250 | 60 | 90 | | 135 |

On comparison of the performance of the compositions just described, in terms of pot life, it becomes evident that the addition or substitution of magnesium silicate in conventional zinc ammonium chloride fluxes (run H) can increase pot life by up to 100% (run B) in the preferred embodiment and still contributing quite significantly to pot life when used in less than optional proportions (runs A, C and D). The pot life measurements also bring out the uniqueness of magnesium silicate in this application as compared to other common silica containing substances such as aluminum silicate and silica. To be noted in this respect is the 200+% longer pot life shown by runs A to D which contain various levels of magnesium silicate, as opposed to the aluminum silicate and the silica runs (E and F).

In addition to longer pot life, the fluxes of the invention possess several other advantages such as being one-package compositions, lower water pick-up and higher resistance to caking, and, as shall be demonstrated later, greatly reduced smoke emission characteristics.

The one-package feature simplifies the use of the fluxes in industry in that the replenishing of the flux blanket on the molten solder bath is done with the same composition with which the blanket was started. With some conventional fluxes, replenishment involves the addition of a composition different from the original one. This feature, of course, requires the stocking of different formulas and may lead to error in the replenishment process.

The water pick-up characteristic was measured by exposing different fluxes to the atmospheres for various periods of time and determining the weight gain due to moisture pick-ups. It was thus found that the flux of the invention, e.g. run B, gained 4.4% in weight after one hour of exposure as opposed to a weight gain of 5.4% for a conventional material such as run H. This constitutes an improvement of almost 25%. At the end of a six-hour exposure, the new fluxes still contained 10% less moisture than the conventional ones, a feature which while not appearing too significant per se is directly responsible for the desirable non-caking properties of the new materials.

EXAMPLE 2

The smoke emission characteristics of the magnesium silicate-containing fluxes of the invention was determined on an industrial can soldering line and compared to conventional types of flux such as those illustrated in run G and H.

The following can line conditions availed for the test:

Can size: 300×407
Pot temperature: 770° F.—lead; 750° F.—trail
Type solder: 2/98
Line speed: 495 can/min.
Roll speed: 72 r.p.m.

A Staplex particulate matter sampler (model SH 810–TFIH) was attached to the can body making machine duct work to measure smoke and emission materials. The instrument determines the weight of solids filtered out of a portion of an exhaust air stream and thus permits a comparison of different smoke generating activities.

On testing the flux of run B in this manner, it was found that 0.4221 grams of particulate solids were emitted during the first half hour in contrast to 0.624 g. for the run G material and 1.53 g. for run H material. Further half hour readings during the next 2.5 hours ranged from 0.4414 to 0.3437. It can thus be seen that there is a reduction of 30 to 70% in the amount of particulate solids emitted from a hot solder bath flux blanket when magnesium silicate is present in the proportions disclosed. In a typical plant, the 1.53 g. reading of the conventional flux tested corresponds to a Ringelmann number of 2 to 2.5, a level of smoking which is currently considered unacceptable. It is evident, therefore, that a reduction of about 70% in Staplex values, which returns smoke emission to an acceptable level, is highly desirable.

What is claimed:

1. In a solder flux comprising (1) a zinc chloride-ammonium chloride mixture constituting at least 60% of the composition weight and containing between about 44 and 54% of the ammonium salt, and (2) about 0.1 to 1% of a resin capable of melting before it decomposes while being heated to fluxing temperatures, the incorporation of between about 1.5 and 10% by weight of a finely divided magnesium silicate.

2. A flux as in claim 1, wherein there is incorporated between about 3% and 5.5% of a —325 mesh magnesium silicate.

3. A flux as in claim 2, wherein an inert lightweight particulate siliceous material constitutes up to 12% by weight of the composition of the flux.

4. A flux as in claim 2 wherein there is contained between about 1.5 to 22.5% by weight of an alkali metal chloride or a mixture of alkali metal chlorides.

References Cited

UNITED STATES PATENTS

| | | | |
|---|---|---|---|
| 3,380,862 | 4/1968 | O'Brien | 148—23 |
| 2,662,840 | 12/1953 | Shilling et al. | 148—23 |

ALLEN B. CURTIS, Primary Examiner

M. L. BELL, Assistant Examiner

U.S. Cl. X.R.

148—26